US012561382B2

(12) United States Patent
Verma

(10) Patent No.: US 12,561,382 B2
(45) Date of Patent: Feb. 24, 2026

(54) AUTOMATICALLY RESTRUCTURING SEARCH CAMPAIGNS

(71) Applicant: GOOGLE LLC, Mountain View, CA (US)

(72) Inventor: Vineet Verma, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/573,376

(22) PCT Filed: Apr. 17, 2023

(86) PCT No.: PCT/US2023/018794
§ 371 (c)(1),
(2) Date: Dec. 21, 2023

(87) PCT Pub. No.: WO2024/158405
PCT Pub. Date: Aug. 2, 2024

(65) Prior Publication Data
US 2025/0094503 A1 Mar. 20, 2025

(30) Foreign Application Priority Data
Jan. 23, 2023 (IN) .............................. 202341004450

(51) Int. Cl.
*G06F 16/953* (2019.01)
*G06F 16/2458* (2019.01)
(Continued)

(52) U.S. Cl.
CPC ........ *G06F 16/953* (2019.01); *G06F 16/2468* (2019.01); *G06F 16/9024* (2019.01); *G06F 16/906* (2019.01)

(58) Field of Classification Search
CPC .. G06F 16/953; G06F 16/2468; G06F 16/906; G06F 16/9024
See application file for complete search history.

(56) References Cited

U.S. PATENT DOCUMENTS

2005/0044056 A1* 2/2005 Ray ...................... G06V 40/172
706/900
2005/0105712 A1* 5/2005 Williams .............. G10L 13/027
704/275
(Continued)

FOREIGN PATENT DOCUMENTS

JP 2017-76435 A 4/2017

OTHER PUBLICATIONS

International Search Report and Written Opinion for Application No. PCT/US2023/018794, dated Sep. 29, 2023.
(Continued)

*Primary Examiner* — Tony Wu
(74) *Attorney, Agent, or Firm* — MARSHALL, GERSTEIN & BORUN LLP

(57) ABSTRACT

To automatically map keywords to landing pages, a system obtaining a dataset including an initial set of groups of content items, each of the groups mapped to a respective landing page in an initial set of landing pages, and each of the content items associated with one or more keywords in an initial keyword vocabulary; generates a reduced dataset based on the obtained dataset, which includes (i) generating a reduced set of landing pages based on the initial set of landing pages using parameters of links associated with the respective landing pages, (ii) clustering the keywords to determine a set of themes associated with the dataset, and (iii) generating a reduced set of groups, including identifying overlaps in themes included in the set of themes, between the groups. The system further uses the generated
(Continued)

data structure to map a received search term to one or more
of the content items.

20 Claims, 6 Drawing Sheets

(51) Int. Cl.
*G06F 16/901* (2019.01)
*G06F 16/906* (2019.01)

(56) References Cited

U.S. PATENT DOCUMENTS

| | | | | |
|---|---|---|---|---|
| 2008/0040389 | A1* | 2/2008 | Seth | G06F 16/9577 |
| 2009/0319517 | A1* | 12/2009 | Guha | G06F 16/951 |
| | | | | 707/999.005 |
| 2012/0059708 | A1* | 3/2012 | Galas | G06Q 30/0256 |
| | | | | 707/738 |
| 2017/0024446 | A1* | 1/2017 | O'Kane | G06F 16/2282 |
| 2017/0322971 | A1* | 11/2017 | Seshadri | G06F 16/214 |
| 2017/0357985 | A1 | 12/2017 | Zinn et al. | |
| 2021/0241163 | A1* | 8/2021 | Witztum | G06F 16/285 |
| 2023/0074771 | A1* | 3/2023 | Nefedov | G06F 16/9024 |

OTHER PUBLICATIONS

Office Action for Japanese Application No. 2024-542054, dated Jul.
22, 2025.

* cited by examiner

100

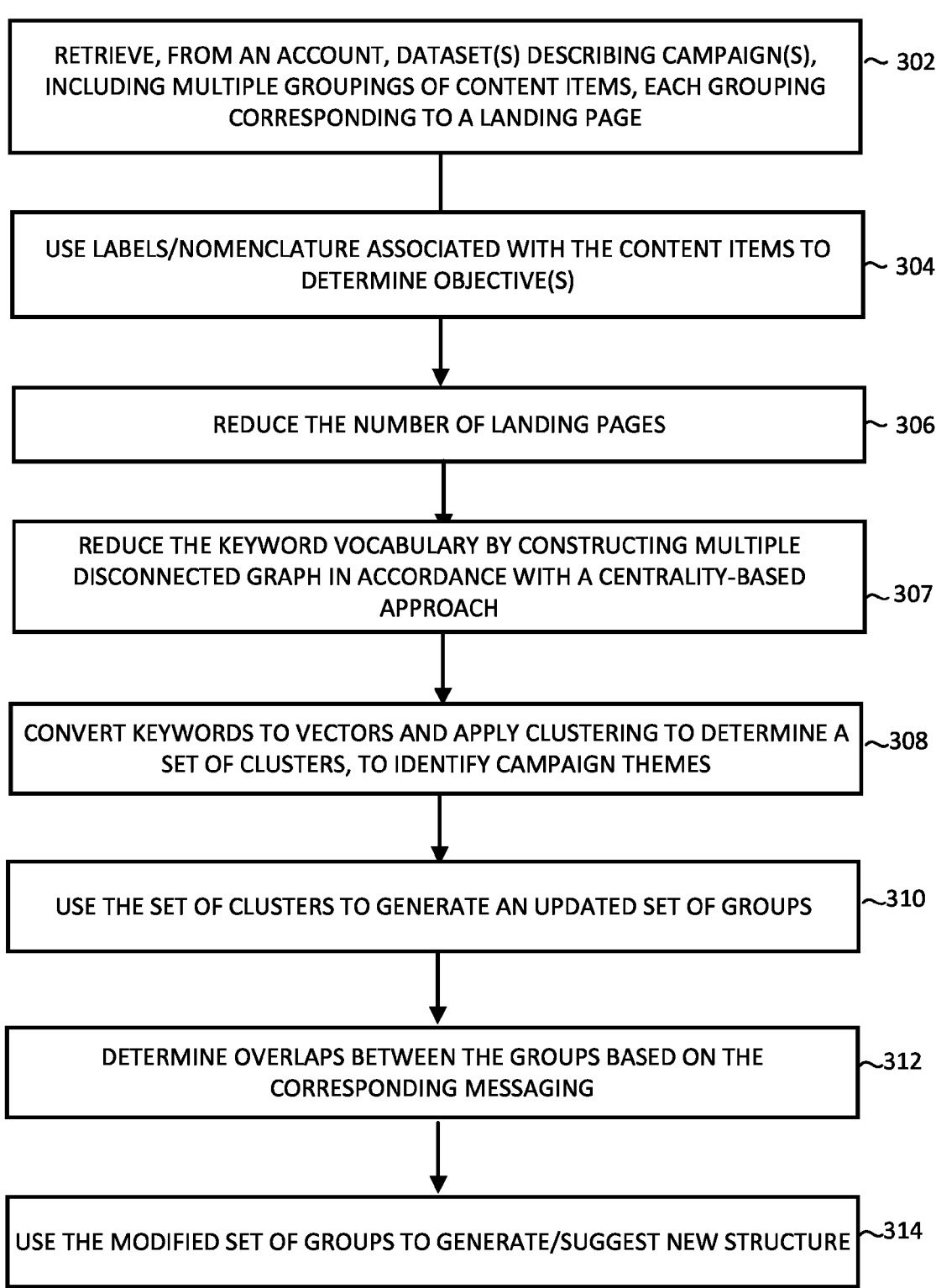

300

RETRIEVE, FROM AN ACCOUNT, DATASET(S) DESCRIBING CAMPAIGN(S), INCLUDING MULTIPLE GROUPINGS OF CONTENT ITEMS, EACH GROUPING CORRESPONDING TO A LANDING PAGE — 302

USE LABELS/NOMENCLATURE ASSOCIATED WITH THE CONTENT ITEMS TO DETERMINE OBJECTIVE(S) — 304

REDUCE THE NUMBER OF LANDING PAGES — 306

REDUCE THE KEYWORD VOCABULARY BY CONSTRUCTING MULTIPLE DISCONNECTED GRAPH IN ACCORDANCE WITH A CENTRALITY-BASED APPROACH — 307

CONVERT KEYWORDS TO VECTORS AND APPLY CLUSTERING TO DETERMINE A SET OF CLUSTERS, TO IDENTIFY CAMPAIGN THEMES — 308

USE THE SET OF CLUSTERS TO GENERATE AN UPDATED SET OF GROUPS — 310

DETERMINE OVERLAPS BETWEEN THE GROUPS BASED ON THE CORRESPONDING MESSAGING — 312

USE THE MODIFIED SET OF GROUPS TO GENERATE/SUGGEST NEW STRUCTURE — 314

REMOVE TRACKING PARAMETERS FROM LINKS ~ 332

DETERMINE A SET OF LANDING PAGES WITH UNIQUE PATH PARAMETERS AND REMOVE NARROW PATH PARAMETERS ~ 334

GENERATE THE REDUCED SET OF LANDING PAGES ~ 336

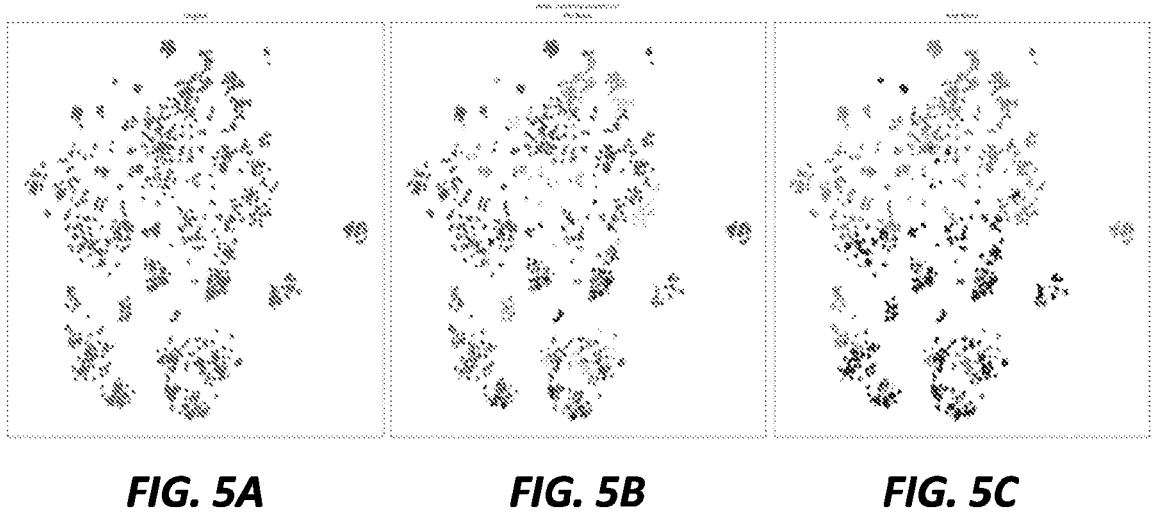
FIG. 5A          FIG. 5B          FIG. 5C
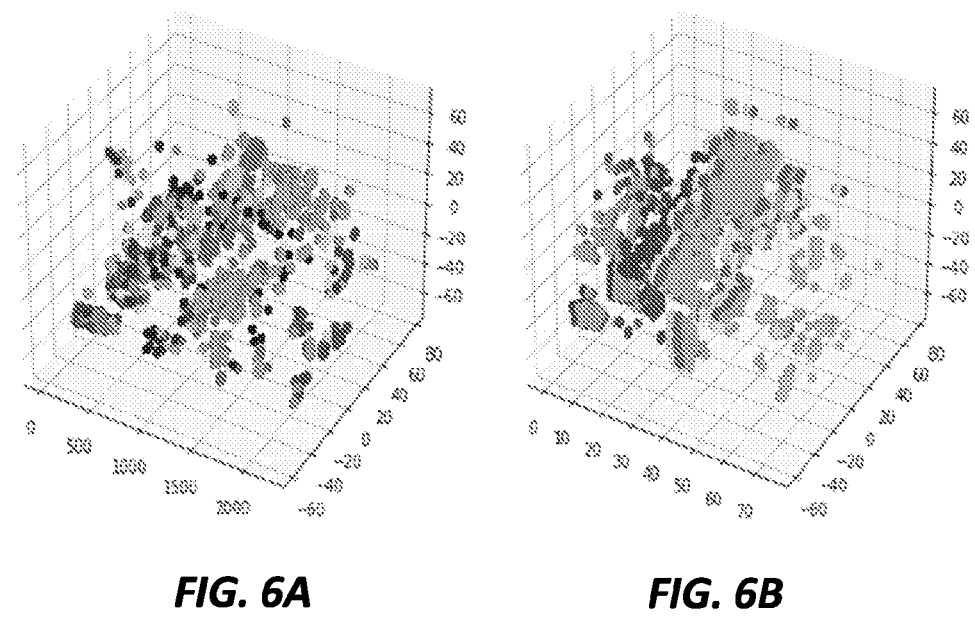
FIG. 6A                    FIG. 6B

AUTOMATICALLY RESTRUCTURING SEARCH CAMPAIGNS

FIELD OF THE DISCLOSURE

This disclosure relates to structuring of search campaigns, and specifically to methods and systems for condensing and restructuring of search terms related to landing pages of web resources.

BACKGROUND

Computing systems that provide search services can provide both the search results and third-party content relevant to the search query. A user for example can access a search engine via a website or a dedicated application and submit a search query that includes one or more search terms. In response to the search query, the system can identify search results responsive the query as well as third-party content relevant to the search terms. The system can provide the third-party content as part of a search campaign for directing traffic to a certain landing page related to a product, service, application, etc.

Operators of search services can design search campaigns to provide third-party content items in view of various quantitative metrics. Examples of such metrics include click-through rate (CTR), cost per click (CPC), cost per acquisition (CPA), conversion rate, etc. A search campaign can include multiple groups of third-party content items, each group associated with a certain intended message. The system can store, for each group or theme, a set of keywords to facilitate the selection of relevant third-party content for a query including these keywords or related keywords. In some cases, providers of third-party content can bid on these keywords.

Datasets required to build and maintain effective search campaigns are often large. Inefficiencies in designing such datasets result in repetitions of keywords over multiple campaigns, mapping excessive numbers of campaigns and/ or content groups to the same landing page, duplicating same text of third-party content over multiple campaigns and groups, etc. Inefficient data structures for supporting automatic bidding and automatic mapping of keywords to third-party content and landing pages result in slower processing time, excessive memory usage, and errors.

SUMMARY

An example embodiment of the techniques of this disclosure is a method of automatically mapping keywords to landing pages. The method includes obtaining a dataset including an initial set of groups of content items, each of the groups mapped to a respective landing page in an initial set of landing pages, and each of the content items associated with one or more keywords in an initial keyword vocabulary; generating a reduced dataset based on the obtained dataset, the generating including: generating a reduced set of landing pages based on the initial set of landing pages using parameters of links associated with the respective landing pages, clustering the keywords to determine a set of themes associated with the dataset, and generating a reduced set of groups, including identifying overlaps in themes included in the set of themes, between the groups. The method further includes using the reduced dataset to map a received search term to one or more of the content items.

BRIEF DESCRIPTION OF THE DRAWINGS

FIG. 3A illustrates a flow diagram of an example method for performing search campaign restructuring;

FIGS. 5A-5C are plots of keywords presented as nodes in 2D vector space; and

FIGS. 6A and 6B present three-dimensional data with each color of FIGS. 5B and 5C having a corresponding value along the z-axis.

DETAILED DESCRIPTION

One or more devices are configured to perform automatic restructuring of search campaigns that result in smaller data structures and higher efficiency of mapping keywords to landing pages. As discussed in more detail below, the automatic restructuring of this disclosure eliminates redundancies in datasets, reduces the number of target sites to which network is directed, and improves the overall accuracy of directing traffic to the target sites.

Figure 1:
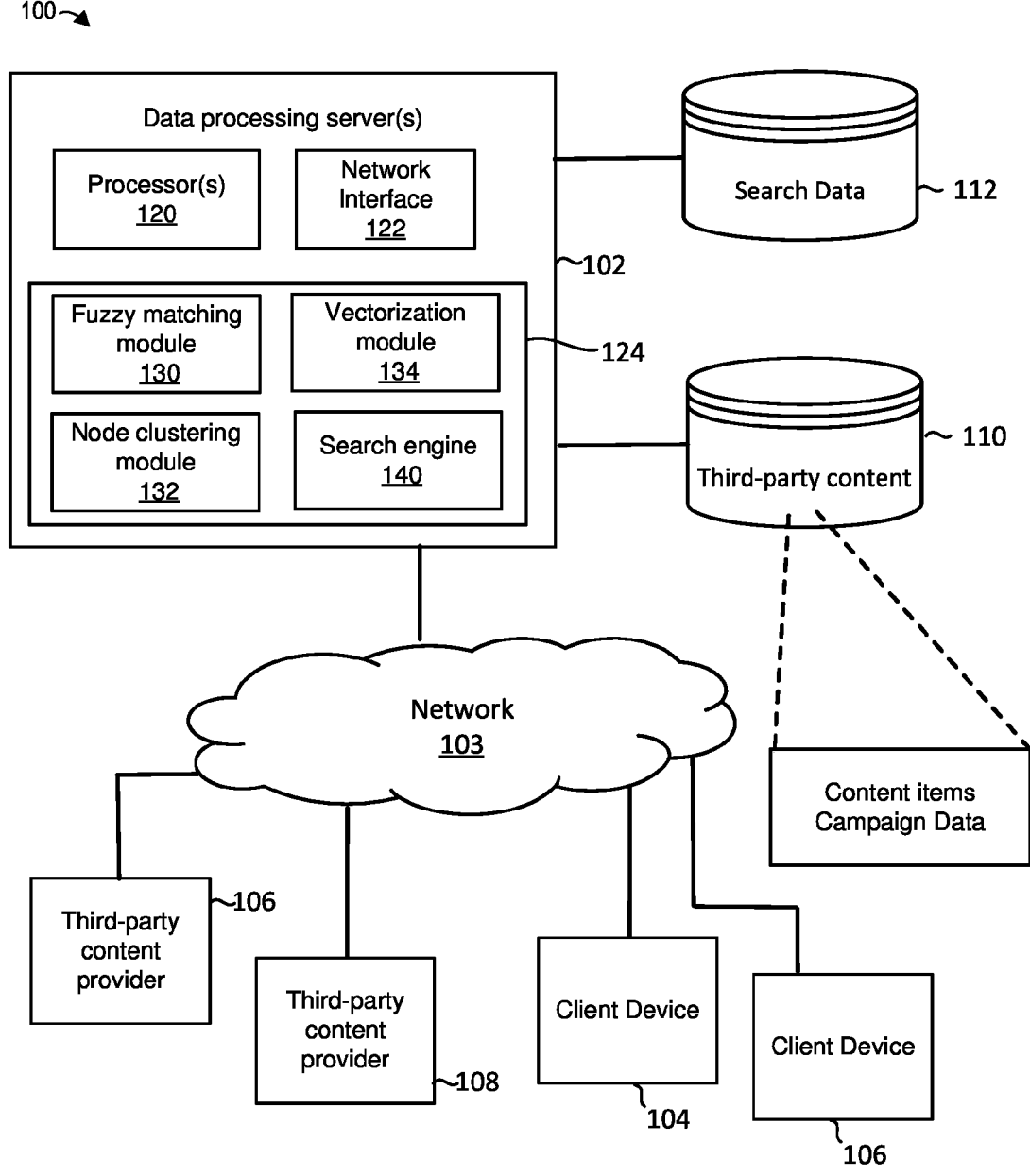
FIG. 1 is a block diagram of an example computing system that can implement the campaign restricting techniques of this disclosure.

Referring first to FIG. 1, an environment 100 includes one or more data processing servers of a system 102 that implement a search service accessible, via a network 103, to client devices such a client device 104 or 106, as well as to third-party content providers 106, 108. The client device 104 can support a software application such as a web browser via which a user can access the search service and submit a search query. An operator of the party content provider 104 or 106 can access the system 102 (typically via a different interface) to develop third-party content such as advertisements including text, video, and audio components, and in some cases software instructions to provide interactivity in the form of animation, gaming, etc. The operator can also design search campaigns so that the server(s) present third-party content along with the search results. The system 102 can store the search campaign data, discussed in more detail with reference to FIG. 2, along with the third-party content in a database 110.

The system 102 includes processing hardware that can include any suitable combination of hardware and software components. The processing hardware for example can include one or more processors configured to execute software instructions stored on a non-transitory computer-readable medium. In this implementation, the system 102 includes at least one processor 120, a network interface, 122, and a memory 124. The processor(s) 120 can include general-purpose processors, application-specific integrated circuits (ASIC), field-programmable gate array (FPGAs), etc. The memory 124 can be a computer-readable, non-transitory form of storage and can include any suitable electronic, optical, magnetic, or any other storage or transmission devices. The memory 124 stores computer-executable instructions that implement various components or modules such as a fuzzy matching module 130, a node clustering module 132, a vectorization module 134, and a search engine 140.

Similarly, the devices 106, 108, 105, and 106 can be or can include any suitable computer servers, personal computers, handheld devices, smart phones, or other computing devices. Each of the devices 106, 108, 105, and 106 can include one or more processors and computer-readable non-transitory memory storing software instructions and data.

The network 103 can be and/or include computer networks such as the Internet, a local area network (LAN), a wide area network (WAN), a metropolitan area network, one or more intranets, a satellite network, a cellular network, an optical network, other types of data network, or a combination thereof. The network 103 can include any number of network devices, such as gateways, switches, routers, modems, repeaters, and wireless access points, among others.

Figure 2:
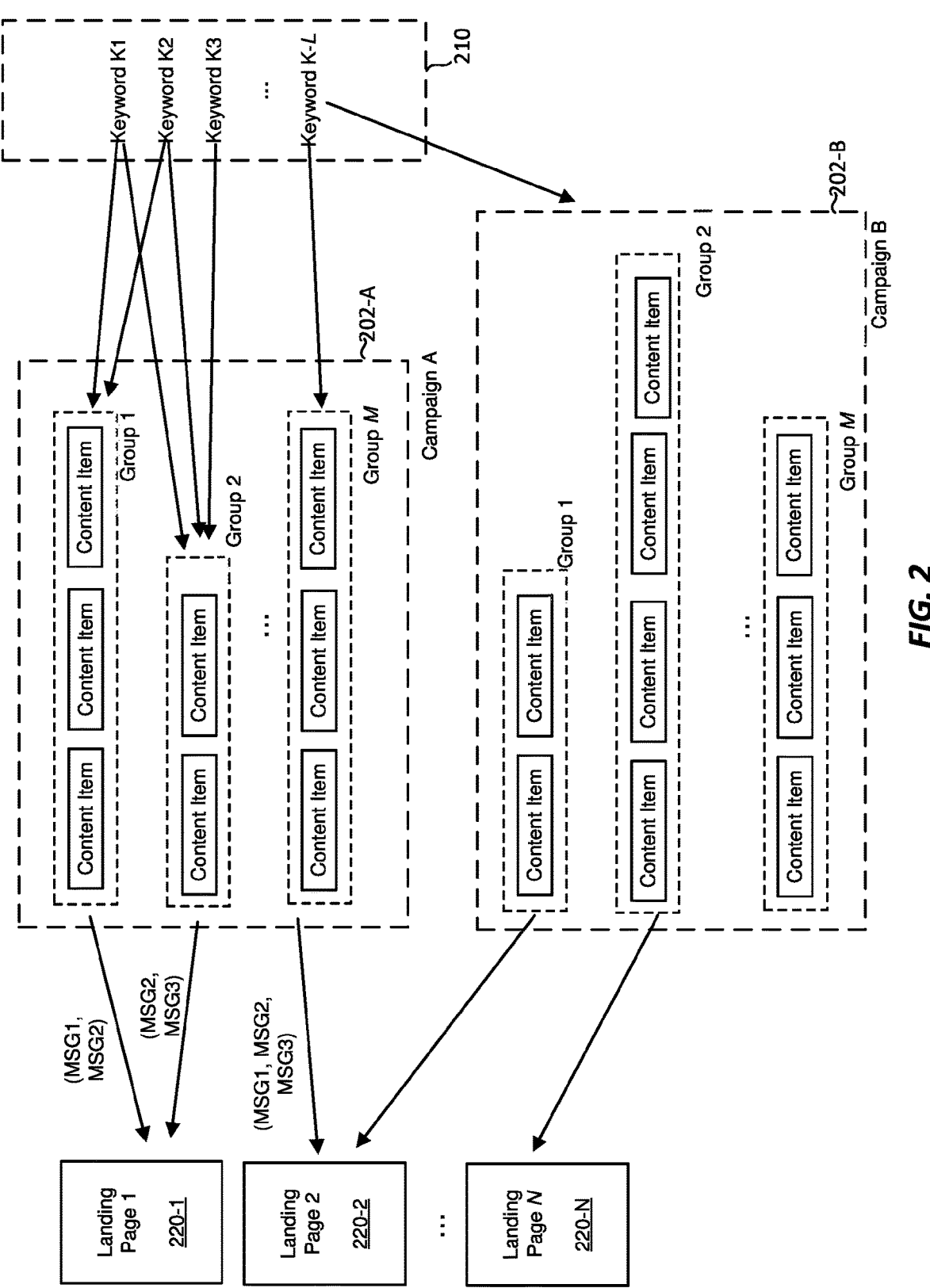
FIG. 2 is a block diagram on an example search campaign structure, on which the system of this disclosure can operate to generate a more efficient structure.

FIG. 2 depicts example structures of search campaign 202-A and search campaign 202-B, which the system 102 can store as sets of data structures in the third-party database 110. The campaign 202-A for example can include multiple content items grouped as illustrated in FIG. 2 into group 1, group 2, . . . group N. In this example, the content items are advertisements grouped accordingly into ad groups. Each keyword in a keyword set vocabulary 210 of the search campaign 202-A is associated with one or more content items of the one or more groups. For example, the search campaign 202-A can include an association of keyword K1 with ad group 1 or ad group 2 depending on certain additional factors such as the demographics of the content consumer.

Each ad group can be associated with a landing page, which the system 102 provides to the content consumer. Each landing page 220-1, 220-2, . . . 220-N can correspond to a product, an application, a website, etc. Ad groups can map to landing pages through messaging, which can be made up (or can be expressed as) sequences of keywords, sentences, phrases, etc. For example, group 1 of the search campaign 202-A corresponds to the landing page 220-1 via messages MSG1 and MSG2, group 2 of the search campaign 202-A corresponds to the landing page 220-2 via messages MSG1, MSG2, and MSG3, etc.

As a more specific example, a message can be a string of keywords forming a sentence such as "visit the holiday resort in town X." Another message can include the same sentence with different punctuation, and as such can be effectively a duplicate of the first message.

The search campaign 202-A can be associated with a user account in which the operator and/or an automated service can continuously grow the number of keywords, ad groups, content items, and landing pages. The links between these elements initially can be unique, but with time each element may link to multiple other elements of the search campaign structure, resulting in low efficiency of providing a correct landing page to a content consumer.

As a more specific example, some of the content items in groups 1 and 2 of campaign 202-A may be the same. Further, certain keywords (see, e.g., keyword K-L in FIG. 2) may map to multiple ad groups and even multiple campaigns. Still further, different ad groups or campaigns may map to landing pages 220-1 and 220-2, even when these landing pages are associated with a common resource (e.g., the same online service).

The components 130, 132, 134, etc. perform campaign restructuring to eliminate redundancy in linking and keyword mapping, and thus make search campaigns less computing-resource-intensive and memory intensive, as well as more effective.

Referring back to FIG. 1, the fuzzy matching module 130 can perform fuzzy matching between keywords for determining matching values. Generally speaking, fuzzy matching is based on comparing strings or other data structures to determine a degree of likeness between the these data structures. In the examples of this disclose, the fuzzy matching module 130 operates on strings. The fuzzy matching module 130 outputs a percentage value, e.g., expressed as a percent or a decimal value less than one (i.e., a matching or 95% and a matching of 0.95 are equivalent). The fuzzy matching module 130 can generate and store matching values as individual values, in a vector, in a matrix, or in another data structure.

The node clustering module 132 can determine node clusters from matching values of pairs of keywords, as illustrated in FIGS. 3A-3C and 4A-4D. The node clustering module 132 can generate datasets that can graphically represented as interconnected nodes. After generating a certain cluster, the node clustering module 132 can determine a central node for the node cluster. The system 102 an associate the central node with the most accurate representation of all the nodes in the cluster.

In some implementations, a node cluster may include very closely associated nodes, for example a cluster of nodes no more than two hops (i.e. one intermediate node) away from the central node. In other implementations, a node cluster may be a group of nodes no more than three, four, or five hops away from the central node. In further implementations, a user determines the size of the node cluster to be determined by the node clustering module 132. The desired size of a node cluster may be limited be hardware of the system 102 (e.g., memory, bandwidth, etc.) or other devices of the system 100. Because the complexity of a search campaign greatly increases with the number of keywords, the system 120 advantageously reduces the number of nodes by generating large node clusters and reducing node clusters by removing all nodes of the node cluster other than the central node, i.e., reducing the cluster to its most central node.

In some implementations, the node clustering module 132 determines the central node as a node having the shortest total number of hops, or shortest cumulative distance to all other nodes in the node cluster. The node clustering module 132 can identify the central node as the node having the highest cumulative matching value to all other nodes of a node cluster, or the node clustering module 132 can identify the central node using another metric indicative of the degree of likeness of the central node to other nodes of the node cluster.

The vectorization module 134 performs vectorization of various keywords, so that the system 102 can apply vector analysis to the keywords. As discussed below, the vectorization module 134 may use a Word2Vec model for vectorizing text or strings, or it may use another vectorization technique such as a term frequency-inverse document frequency vectorization for example. The vectorization module 134 in some implementations vectorizes data of types other than strings.

Next, FIG. 3A depicts a flow diagram of an example method 300 for performing search campaign restructuring. The method 300 may be implemented in the search campaign restructuring system 100 of FIG. 1, or another suitable in system.

At block 302, the system 102 accesses a user account. The user account can include information associated with a user or business profile, and the system 102 can retrieve the datasets describing a campaign. For example, the user account can include a description of a campaign including (i) multiple landing pages, (ii) information based on which the system 102 can identify business objectives (e.g., labels assigned by the operator, references to geographic locations for location-specific campaigns, indications of brand or core competition), (iii) indications of ad groups or, more generally, grouping of content items, (iv) messaging linking ad groups to landing pages or information from which the system 102 can derive the messaging, (v) keywords, (iv) ads or other content items including text, multimedia content, code, etc. The description of a campaign in general can include any number of components and links between these components.

Next, at block 304, the system 100 determines one or more objectives associated with the profile. The system 102 can determine the objectives using one or more labels assigned to the individual content items, ad groups, and/or campaigns, or by processing the nomenclature which differentiates the campaigns into goals such as brand/core/competition or geographic goals (e.g., achieve a certain level of interaction with content items within a particular geographic area). For example, one or more labels indicate that the objective is to maximize traffic directed to the landing page.

At block 306, the system 102 identifies and then reduces the number of unique landing pages associated with a user account. To this end, the system 102 can remove tracking parameters, remove narrow path parameters, and identify landing pages with unique path parameters, for example. An example implementation of step 306 is discussed with reference to FIG. 3B below.

At block 307, the system 102 reduces the keyword vocabulary. Generally speaking, the system 102 at this step generates a smaller keyword vocabulary by identifying keywords with the same (e.g., "car loans" and "carloans") or sufficiently similar meaning and mapping the identified keywords onto keywords that remain in the reduced vocabulary set. Because the unique keywords in some scenarios can amount to tens of thousands, and because the complexity of fuzzy comparison is $O(n^2)$, the system 102 thereby reduces fuzzy comparisons. Fuzzy matching, also known as approximate string matching, allows the system 102 to identify two elements of text, strings, or data entries that are approximately similar but not precisely the same (i.e., are near-duplicates).

The system 102 constructs disconnected graphs from the NxN matrix. These graphs are the outputs of fuzzy matching for different groups of keywords. For example, the node clustering module 132 can determine keywords with matching values above the threshold and associate these results with nodes of graphs. Each of the nodes is connected to at least one of node at a distance from any connected nodes that is proportional to the matching value between the keywords.

More particularly, the system 102 (e.g., the fuzzy matching module 130) can build an NxN matrix for storing matching values. The system 102 performs fuzzy matching between all pairs of keywords in combinations. The fuzzy matching technique provides a percent match value that can be compared to a threshold value for determining if two keywords are approximately matched. The matching threshold may be a value provided by a user, or stored in a memory of the system 102. For pairs of keywords having matching values above the matching threshold (e.g., 90%), the system 102 can remove one of the keywords from the keyword vocabulary, while retaining in the keyword vocabulary both keywords in the pairs of keywords that have matching values below the threshold. The system 102 can replace values in the NxN matrix with a value of 0 for fuzzy match percentages below the matching threshold, and retain the non-zero matching percentage value in the NxN matrix for pairs having matching values above the matching threshold.

In an example implementation, the system 102 uses the similarity values to prioritize similar keywords and applies fuzzy matching to determine the percentage match. When the fuzzy match value is less than a predefined threshold of 90%, the system 102 stops processing the rest of the keywords. In the worst-case scenario, this leads to $O(n^2)$ complexity, but in a typical scenario, the complexity is significantly lower. Assuming the average word length is 4.7 characters, and the average number of keywords per search term is 4-5, the system 102 derives exhaustively 1500 character combinations maximum, which is a relatively small burden for computation.

To identify campaign themes at block 308, the system 102 uses the reduced set of keywords, which also can be referred to as a reduced keyword vocabulary, associated with landing pages of the account. Each landing page may be associated with a particular product, and the system 102 can analyze the landing pages to identify the various themes and/or search terms associated with each landing page. The system can 102 can apply unsupervised clustering to determine a theme for a set of products. Each landing page may have different structures based on a website with which the landing page is associated.

More particularly, the system 102 (e.g., the vectorization module 134) converts all the keywords of a reduced keyword vocabulary to vectors. The vectorization module 116 may use a Word2Vec model to convert the keywords to vectors, and the specific Word2Vec model may be chosen depending on a language of the keywords. Accordingly, the system 102 can convert the keywords to a specific language (e.g., English) before converting the keywords to vectors.

The system 102 can apply a term frequency-inverse document frequency (TF-IDF) vectorizer to character n-grams to determine the relevance of out-of-vocabulary keywords and to further exclude these keywords from the vectorization and analysis, or for vectorizing keywords that are out of vocabulary (OOV). In general, OOV keywords are difficult to properly identify and compare because these terms are not in the training set of the model. Keywords are often short in length, and there are often OOV keywords due to the fast-advancing nature of technology, consumer products, and social trends. Typically, the OOV keywords are reduced to a 0 vector during vectorization, which provides no information for performing the campaign restructuring. To process OOV keywords, the system 102 can apply TF-IDF vectorization rather than Word2Vec vectorization.

More particularly, the system 200 can use Word2Vec (e.g., 300 dimensions) to create a base vector for each keyword phrase. The system 102 then takes the mean of each vector for each token in the phrase. The system removes the tokens in the model vocabulary from the keyword string. If the system 102 finds no token from a keyword phrase, the system 102 uses a 0 vector of 300 dimensions is used to represent the keyword. For the remaining tokens(OOV), the system 102 uses the TF IDF vectorizer to create another sparse vector. This vector augments the existing base vector and, if k OOV keywords were present, then k+300 is the final shape of the augmented vector. In this manner, the system 1102 forces vectors to have some direction irrespective of the keyword vocabulary.

Referring to block 308, the system 102 then applies clustering to the vectorized keywords and identifies keyword clusters. The system 100 may use a silhouette score for determining clusters of keywords. A silhouette score threshold may be used to separate the keyword vectors into clusters, for example vectors having a joint silhouette score of greater than 0.5 may be determined to form a cluster, or in examples, joint keyword vectors having a silhouette score of greater than 0 may be determined to form a cluster, while groups having a silhouette score of less than 0 are determined to not form a cluster.

Using clustering, the system 102 identifies campaign themes for the landing pages based on the keywords with which these landing pages are associated. For example, the system 102 can determine that content items associated with keyword "auto loan," "car loan," and "vehicle loan" have a single theme, which the system 102 can identify as "car loan" based on the greater centrality of "car loan" relative to "auto loan" and "vehicle loan."

At block 310, the system 102 forms new groups using the new clusters of keywords. More specifically, the system 102 can generate a new group from each respective cluster. In some implementations, the system 102 can compare the messaging of the new groups to identify potential redundancies within the new groups and, when applicable, further reduce set of groups. Thus, the system 102 in some implementations operates iteratively to further condense the structure and thereby reduce memory consumption and simplify processing. The system 102 can store the new keyword vocabulary, the reduced set of landing pages, and the new ad groups with the corresponding associations between each of these elements as the restructured search campaign in the third-party content database 110, as a reduced dataset for the campaign.

At block 312, the system 102 determines overlaps between groups based on the messaging, to identify the groups that satisfy the requirement of novelty. This requirement can be understood as a group being associated with a message not shared with any other group. The system 102 can consider groups with unique messaging to be properly formed. The system 102 also can generate and apply the novelty ratio metric, which is the percentage of groups that are novel, in a certain account.

More specifically, the system 102 at block 312 can first build a TF-IDF vector using character n-grams. The system 102 can then evaluate a cosine similarity to build a priority queue for evaluation and then use fuzzy matching to identify similar messaging and similar groups of content items.

After the system 102 restructures a campaign as discussed above, the search engine 140 can use the reduced dataset to more efficiently identify a content item for presentation along with a search result in response to a search query from a user device, and to more efficiently perform other processing associated with a campaign (e.g., calculating various metrics such as CTR). The system 102 operates on a smaller dataset with fewer groups and fewer links to landing pages, for example.

In some implementations, the system 102 at block 312 uses the modified groups to suggest a new campaign structure to a user, who can accept and/or further modify the campaign structure via a user interface.

Figure 3B:
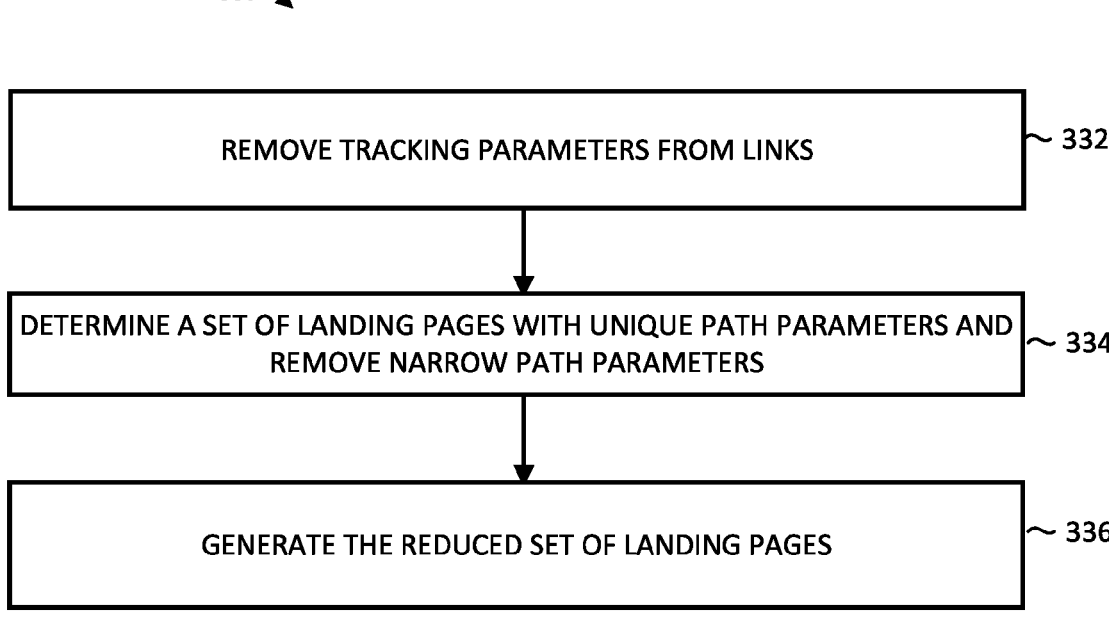
FIG. 3B illustrates a flow diagram of an example method for reducing a set of landing pages.

FIG. 3B is a flow diagram of an example method 330 for reducing a set of landing pages by eliminating multiple landing pages associated with the same resource and being different in only certain types of link parameters. The system 102 can use this method during the process of restructuring a search campaign. Generally speaking, landing pages can have different structures. The system 120 can use the underlying structure of a website (e.g., the hierarchies, the linking) to differentiate two landing pages based on path parameters or query parameters. For example, a travel or e-commerce domain website typically depends to a large on query parameters because these query parameters can define the search parameters and thus the target object (e.g., a product). On the other hand, finance websites for example depend more on path parameters and have the corresponding structure. Further, besides base parameters, campaign planners can add tracking parameters for attribution and reporting purposes, thereby making the problem of reducing the set of landing pages more complicates.

The method 330 begins at block 332, where the system 102 removes tracking parameters from links. For example, the system 102 can identify query parameters having a prefix of "utm" and remove any landing pages associated with the identified query parameters. The prefix "utm" indicates that the query parameter is a tracking parameter and is therefore not a search parameter that is used for guiding a user to a landing page. In this example, the prefix of "utm" is used to identify and exclude keywords and landing pages of certain query parameters, but more generally the system 102 can use other prefixes or suffixes to identify and exclude query parameter keywords, and landing pages associated with the identified query parameters.

At block 334, the system 102 determines query parameters that may be too specific or too unique and removes keywords and/or landing pages associated with those query parameters from the keyword vocabulary. For example, the system can retain a query parameter such as "language=English" in the query parameter set, but determine that parameters such as "page=1, 2, 3" are too narrow. The system 102 can remove the keywords and/or landing pages associated with the "page" query because page numbers are unique identifiers and are not categorical or content classifying in nature. Removal of keywords and landing pages associated with the tracking parameters and the overly specific parameters reduces the set of unique landing pages allowing for campaign restructuring that results in efficient search campaign structures. Finally, at block 335, the system 102 can generate a reduced set of landing page set to facilitate subsequent search campaign restructuring, as discussed above with reference to FIG. 3A.

For clarity, FIGS. 4A-4D include graphical representations of the discussed graphs as plots of keyword nodes generated from an N×N matrix of fuzzy keyword matching values. Each matching value is represented by a node, illustrated as a dot in FIGS. 4A-4D. Each node is connected to neighbor nodes by lines to create clusters, with each of the lines having a length that is proportional to the matching value between the keywords of the nodes. Each cluster of nodes represents a group of keywords which have been determined to be similar in content or topic through fuzzy matching.

Figures 4A, 4B, 4C, 4D:
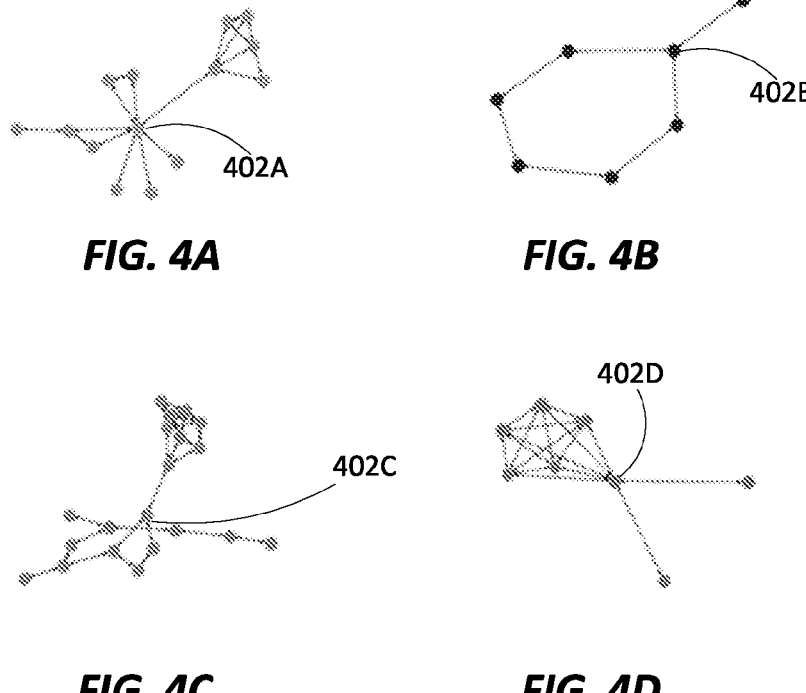
FIGS. 4A-4D are plots of keyword nodes generated from an N×N matrix of Fuzzy Keyword matching values.

At block 368, the system 102 identifies a central node of each cluster, as further illustrated in FIGS. 4A and 4D (as nodes 402A-D). The system 102 can determine a node having a highest degree of centrality for a given cluster as the central node 402A-D. The system 102 can determine centrality using various means, for example by selecting as a central node the node with the least cumulative distance to all other nodes of the cluster. The central node 402A-D is associated with a keyword, or pair of keywords which may best represent all of the keywords associated with nodes of a cluster. Therefore, keywords of the central nodes 402A-D may represent all keywords of a cluster, and the system 102 can remove the other keywords associated with the remaining nodes of the cluster. The system 102 uses the central nodes of the clusters to generate a reduced keyword vocabulary.

The keyword reduction technique discussed with reference to FIG. 3C can reduce the keyword vocabulary by more than half, in some scenarios. Additionally, the fuzzy matching approach discussed above allows the system 102 to identify and remove redundant and misspelled words in the keyword vocabulary.

Referring back to FIG. 3A, in some implementations, the system 102 at block 310 also reduces the number of group (e.g., ad groups when the content items are advertisements) using fuzzy matching. Similar to the keywords, text included in content items that make up groups may be similar, misspelled, or redundant. For example, content items including text "home financing" and "home loan" may have proximate or identical meaning. Yet using a vector model to categorize content item groups may result in grouping the content items with these two version of text into different themes resulting in redundant groups, which may complicate the search campaign or result in faulty search results. Thus, reducing the groups before performing vector analysis simplifies the restructured search campaign, allowing for faster search results and increased search campaign efficacy.

To reduce the groups, the fuzzy matching module 132 in an example implementation performs fuzzy matching of all text components with all other text components of groups, and generates a matching score for each pairing. The system 102 identifies all text pairings having a matching of 0.95 or greater and flags these as likely having the same messaging. For example, a matching score of 0.95 may occur due to text typos, additions of spaces, changes in punctuation, or other minor differences of text without changing messaging or content. The system 102 further compares groups by assigning each group a matching score. The matching score for an group can be determined by dividing the number of text component having a matching score above 0.95 by the total number of content items in the group of content items. This group matching value may be different depending on A→B and B→A resulting in a directional relationship for forming a directional graph.

The system 102 matching terms having a match of greater than 0.60 and removes one of each pair of text for each pair having a matching value above 0.60, thereby reducing the groups by removing content items having similar or same messaging. Similar to the keyword reduction process, the system 102 can construct a matching matrix and generate nodes representing groups, as illustrated in FIGS. 4A-4D. Each node similarly can be connected to nearest neighbor group nodes, and a central group node can be identified, with the central group node being the best representation of all groups interconnected with the central group.

The system 102 then can determine the core theme of the central group by determining a keyword frequency for search keywords associated with the various ads of the central ad group. For example, the keywords that occur most across content items of the central group in a cluster may provide a general understanding of the core content of the central group of content items. Further, the system 102 can apply natural language processing and stopword removal to determine themes and general overall content of the central group. Finally, after the system 102 has identified one or more central groups, the system 102 can consider (e.g., by setting appropriate flags) the new set of groups to be novelty groups, with each group having unique messaging and content.

For further clarity, FIGS. 5A-5C illustrate plots of keywords presented as nodes in a 2D vector space. FIG. 5A illustrates the keywords of a search campaign vectorized into a 2D space. FIG. 5B illustrates the keyword nodes shaded according to how the keywords are grouped before performing the restructuring described herein. FIG. 5C shows the keyword nodes shaded according to specific campaigns after performing restructuring of the campaigns of the user account. FIG. 5C includes far fewer shades than FIG. 5B, indicating far less campaigns after restructuring.

FIGS. 6A and 6B present three-dimensional data with each shading of FIGS. 5B and 5C having its own value along the z-axis. The z-axis of FIG. 6A is the left and right axis with values between 0 and 2000, while FIG. 6B has a maximum z-axis value of 70. The reduction of nearly 2000 campaigns to just around 60 campaigns results in a compression, or reduction of approximately 97%.

The disclosed methods for restructuring search campaigns have been performed experimentally and have provided greater than 50% reduction of campaigns and groups of content items. In some examples, a single pass of the disclosed methods reduced campaigns of a user account by greater than 90%, and reduced groups associated with a user account by greater than 80%. Performing subsequent passes of the described methods further reduced the campaigns and groups of content items. Additionally, the success rate of providing a correct group of content items to a consumer was increased by over 600%, and the novelty index for landing pages increased by more than 600% as well.

The following additional considerations apply to the foregoing discussion.

A user device in which the techniques of this disclosure can be implemented can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may be software modules (e.g., code, or machine-readable instructions stored on non-transitory machine-readable medium) or hardware modules. A hardware module is a tangible unit capable of performing certain operations and may be configured or arranged in a certain manner. A hardware module can include dedicated circuitry or logic that is permanently configured (e.g., as a special-purpose processor, such as a field programmable gate array (FPGA) or an application-specific integrated circuit (ASIC), a digital signal processor (DSP)) to perform certain operations. A hardware module may also include programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs for managing radio bearers through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed is:

1. A method of automatically mapping keywords to landing pages, the method comprising:

obtaining, by processing hardware, a dataset including an initial set of groups of content items, each of the groups mapped to a respective landing page in an initial set of landing pages, and each of the content items associated with one or more keywords in an initial keyword vocabulary;

generating, by the processing hardware, a reduced dataset based on the obtained dataset, the generating including:

generating a reduced set of landing pages based on the initial set of landing pages using parameters of links associated with the respective landing pages, generating keyword clusters by clustering the keywords to determine a set of themes associated with the dataset, wherein each keyword cluster of the keyword clusters includes a theme corresponding to a keyword having a greater centrality relative to other keywords of the keyword cluster, and generating a reduced set of groups of content items, including identifying overlaps in themes included in the set of themes, between the groups such that each group of the reduced set of groups includes a different theme of the set of themes;

storing, by the processing hardware, the reduced data set in a data structure, such that the set of themes are associated in the data structure with the reduced set of groups which are associated with the reduced set of landing pages; and using the reduced dataset including the reduced set of landing pages and the reduced set of groups to map a received search term to one or more of the content items.

2. The method of claim 1, wherein generating the reduced set of landing pages includes determining that a first landing page and a second landing page correspond to a common resource based on one or more path parameters of the first landing page and the second landing page.

3. The method of claim 1, wherein generating the reduced set of landing pages includes determining that a first landing page and a second landing page correspond to a common resource based on one or more query parameters of the first landing page and the second landing page.

4. The method of claim 1, wherein clustering the keywords includes applying Word2Vec vectorization.

5. The method of claim 1, wherein clustering the keywords includes calculating a silhouette score.

6. The method of claim 1, wherein clustering the keywords includes applying an unsupervised clustering technique.

7. The method of claim 1, wherein clustering the keywords includes applying TF-IDF vectorization to identify out-of-vocabulary (OOV) words.

8. The method of claim 1, further comprising:

generating a reduced keyword vocabulary prior to the clustering of the keywords.

9. The method of claim 8, wherein generating the reduced keyword vocabulary includes applying fuzzy matching to reduce a number of the keywords in the initial keyword vocabulary.

10. The method of claim 9, wherein the applying of the fuzzy matching includes:

evaluating a cosine similarity between the keywords to build a priority queue.

11. The method of claim 9, wherein the applying of the fuzzy matching includes:

constructing an N×N matrix for storing matching values.

12. The method of claim 11, wherein the generating of the reduced keyword vocabulary includes:

constructing disconnected graphs based on the matrix, each disconnected graph including a plurality of nodes corresponding to respective similar keywords that form a keyword cluster.

13. The method of claim 12, further comprising:

identifying a central node in each of the disconnected graph; and reducing the keyword cluster to a keyword associated with the central node.

14. A system comprising:

one or more processors; and a computer-readable medium storing instructions that, when executed by the one or more processors, cause the system to:

obtain a dataset including an initial set of groups of content items, each of the groups mapped to a respective landing page in an initial set of landing pages, and each of the content items associated with one or more keywords in an initial keyword vocabulary;

generate a reduced dataset based on the obtained dataset, the generating including:

generating a reduced set of landing pages based on the initial set of landing pages using parameters of links associated with the respective landing pages, generating keyword clusters by clustering the keywords to determine a set of themes associated with the dataset, wherein each keyword cluster of the keyword clusters includes a theme corresponding to a keyword having a greater centrality relative to other keywords of the keyword cluster, and generating a reduced set of groups of content items, including identifying overlaps in themes included in the set of themes between the groups such that each group of the reduced set of groups includes a different theme of the set of themes;

store the reduced dataset in a data structure, such that the set of themes are associated in the data structure with the reduced set of groups which are associated with the reduced set of landing pages; and use the reduced dataset including the reduced set of landing pages and the reduced set of groups to map a received search term to one or more of the content items.

15. The system of claim 14, wherein generating the reduced set of landing pages includes determining that a first landing page and a second landing page correspond to a common resource based on one or more path parameters of the first landing page and the second landing page.

16. The system of claim 14, wherein generating the reduced set of landing pages includes determining that a first landing page and a second landing page correspond to a common resource based on one or more query parameters of the first landing page and the second landing page.

17. The system of claim 14, wherein clustering the keywords includes applying Word2Vec vectorization.

18. The system of claim 14, wherein clustering the keywords includes calculating a silhouette score.

19. The system of claim 14, wherein clustering the keywords includes applying an unsupervised clustering technique.

20. The system of claim 14, wherein clustering the keywords includes applying TF-IDF vectorization to identify out-of-vocabulary (OOV) words.

* * * * *